(12) United States Patent
Chan et al.

(10) Patent No.: US 8,873,507 B2
(45) Date of Patent: Oct. 28, 2014

(54) DISTRIBUTED LOCAL MOBILITY ANCHORS FOR ACHIEVING OPTIMIZED MOBILITY ROUTING

(75) Inventors: Hinghung Anthony Chan, Plano, TX (US); Yangsong Xia, Nanjing (CN); Justin Zengjun Xiang, Vernon Hills, IL (US)

(73) Assignee: FutureWei Technologies, Inc., Plano, TX (US)

( * ) Notice: Subject to any disclaimer, the term of this patent is extended or adjusted under 35 U.S.C. 154(b) by 523 days.

(21) Appl. No.: 12/841,729

(22) Filed: Jul. 22, 2010

(65) Prior Publication Data

US 2011/0080872 A1    Apr. 7, 2011

Related U.S. Application Data

(60) Provisional application No. 61/248,365, filed on Oct. 2, 2009, provisional application No. 61/260,285, filed on Nov. 11, 2009.

(51) Int. Cl.
| | |
|---|---|
| *H04W 4/00* | (2009.01) |
| *H04W 8/08* | (2009.01) |
| H04W 40/36 | (2009.01) |
| H04W 80/04 | (2009.01) |

(52) U.S. Cl.
CPC .............. *H04W 8/082* (2013.01); *H04W 40/36* (2013.01); *H04W 80/04* (2013.01)
USPC ............ 370/331; 370/351; 370/401; 455/436

(58) Field of Classification Search
USPC ................... 370/328, 331, 351, 401; 455/436
See application file for complete search history.

(56) References Cited

U.S. PATENT DOCUMENTS

| | | | |
|---|---|---|---|
| 7,127,700 | B2 | 10/2006 | Large |
| 7,603,477 | B2 | 10/2009 | Choi et al. |
| 7,676,595 | B2 | 3/2010 | Ettikan |

(Continued)

FOREIGN PATENT DOCUMENTS

| | | |
|---|---|---|
| CN | 101175316 A | 5/2008 |
| CN | 101212773 A | 7/2008 |

(Continued)

OTHER PUBLICATIONS

Gundavelli, S., et al., "Proxy Mobile IPv6", RFC 5213, Standards Track, Aug. 2008, pp. 41-67.

(Continued)

*Primary Examiner* — Gary Mui
(74) *Attorney, Agent, or Firm* — Slater & Matsil, L.L.P.

(57) ABSTRACT

A method and system for optimizing mobility routing are disclosed. A preferred embodiment comprises a home local mobility anchor and two or more distributed local mobility anchors, wherein the distributed local mobility anchors have a reduced functionality from the home local mobility anchor. A first distributed local mobility anchor may send an initial data packet from a correspondent node to the home local mobility anchor, which may route the initial data packet to a second distributed local mobility anchor where a mobile node is anchored while also sending the location of the mobile node back to the first distributed local mobility anchor. Subsequent packets can be sent by the first distributed local mobility anchor directly to the second distributed local mobility anchor and bypassing the home local mobility anchor.

23 Claims, 8 Drawing Sheets

(56) References Cited

U.S. PATENT DOCUMENTS

| | | | |
|---|---|---|---|
| 7,840,217 B2 | 11/2010 | Patel et al. | |
| 7,965,695 B2 | 6/2011 | Valko et al. | |
| 8,040,845 B2 * | 10/2011 | Oulai et al. | 370/329 |
| 8,068,840 B2 | 11/2011 | Patel et al. | |
| 8,085,793 B2 | 12/2011 | Krishnan et al. | |
| 8,102,815 B2 | 1/2012 | Krishnan | |
| 8,160,038 B1 | 4/2012 | Zhao et al. | |
| 8,170,010 B2 * | 5/2012 | Bachmann et al. | 370/389 |
| 8,265,037 B2 | 9/2012 | Park et al. | |
| 8,385,263 B2 | 2/2013 | Hirano et al. | |
| 8,570,941 B2 | 10/2013 | Tsirtsis et al. | |
| 2003/0035390 A1 | 2/2003 | Choi et al. | |
| 2006/0018291 A1 * | 1/2006 | Patel et al. | 370/335 |
| 2006/0291446 A1 | 12/2006 | Caldwel et al. | |
| 2007/0189219 A1 | 8/2007 | Navali et al. | |
| 2007/0254661 A1 | 11/2007 | Chowdhury et al. | |
| 2008/0084847 A1 | 4/2008 | Xia et al. | |
| 2009/0040964 A1 * | 2/2009 | Zhao et al. | 370/328 |
| 2009/0080441 A1 | 3/2009 | Krishnan et al. | |
| 2009/0090441 A1 * | 4/2009 | Benazet et al. | 149/45 |
| 2009/0248708 A1 | 10/2009 | Balasubramanian et al. | |
| 2009/0290529 A1 | 11/2009 | Toyokawa et al. | |
| 2009/0303932 A1 * | 12/2009 | Tsirtsis et al. | 370/328 |
| 2009/0310564 A1 | 12/2009 | Kim et al. | |
| 2010/0046419 A1 | 2/2010 | Hirano et al. | |
| 2010/0080172 A1 * | 4/2010 | Jin et al. | 370/328 |
| 2010/0082796 A1 * | 4/2010 | Akiyoshi | 709/223 |
| 2010/0150055 A1 | 6/2010 | Hori et al. | |
| 2010/0177698 A1 | 7/2010 | Salmela et al. | |
| 2010/0208691 A1 | 8/2010 | Toyokawa | |
| 2010/0214982 A1 * | 8/2010 | Hirano et al. | 370/328 |
| 2010/0268804 A1 * | 10/2010 | Aso et al. | 709/222 |
| 2010/0278070 A1 * | 11/2010 | Melia et al. | 370/254 |
| 2010/0284329 A1 | 11/2010 | Park et al. | |
| 2010/0296481 A1 * | 11/2010 | Weniger et al. | 370/331 |
| 2010/0303031 A1 | 12/2010 | Rune | |
| 2011/0002248 A1 | 1/2011 | Hirano et al. | |
| 2011/0002300 A1 | 1/2011 | Lee et al. | |
| 2011/0026453 A1 | 2/2011 | Yan | |
| 2011/0080866 A1 | 4/2011 | Chan et al. | |
| 2011/0116450 A1 | 5/2011 | Hirano et al. | |
| 2011/0149839 A1 | 6/2011 | Toyokawa et al. | |
| 2011/0170479 A1 | 7/2011 | Chan et al. | |
| 2011/0246629 A1 | 10/2011 | Savolainen et al. | |
| 2011/0255473 A1 | 10/2011 | Wu et al. | |
| 2012/0120872 A1 | 5/2012 | Korhonen et al. | |
| 2012/0140719 A1 | 6/2012 | Hui et al. | |

FOREIGN PATENT DOCUMENTS

| | | | |
|---|---|---|---|
| WO | WO 01/67798 A1 | 9/2001 | |
| WO | WO 2006/012511 A1 | 2/2006 | |
| WO | 2009016059 A1 | 2/2009 | |
| WO | WO 2009/044539 A1 | 4/2009 | |

OTHER PUBLICATIONS

International Search Report regarding International Patent Application No. PCT/CN2010/076991, dated Dec. 23, 2010, 3 pages.

Written Opinion of the International Searching Authority regarding International Patent Application No. PCT/CN2010/076991, dated Dec. 23, 2010, 4 pages.

International Search Report regarding International Patent Application No. PCT/CN2010/076825, Dec. 16, 2010, 3 pages.

Written Opinion of the International Searching Authority regarding International Patent Application No. PCT/CN2010/076825, Dec. 16, 2010, 5 pages.

* cited by examiner

DISTRIBUTED LOCAL MOBILITY ANCHORS FOR ACHIEVING OPTIMIZED MOBILITY ROUTING

This application claims the benefit of U.S. Provisional Application No. 61/248,365, filed on Oct. 2, 2009, entitled "Distributed Mobility Anchors for Mobility Management" and U.S. Provisional Application No. 61/260,285, filed on Nov. 11, 2009, entitled "Distributed Mobility Anchors for Network-Based Mobility" both of which are hereby incorporated herein by reference.

TECHNICAL FIELD

The present invention relates generally to network communication technology, and more particularly to a system and method for optimizing data routing between a mobile node and a correspondent note in a Proxy Mobile Internet Protocol (PMIP) network.

BACKGROUND

Wireless communication systems have become an important means by which many people worldwide have come to communicate. A wireless communication system interconnects many nodes by using electromagnetic waves, such as radio waves, rather than wires as commonly used in a fixed telephone network system. A wireless communication system often includes of many mobile devices and a plurality of base stations. A base station serves a mobile device when the mobile device enters a region associated with the base station.

A modern communication system includes many interconnected networks, which consist of both wireless networks and fixed phone networks. In a modern communication network, each mobile device has its own internet protocol (IP) address. The IP addresses are used to transmit data packets from one mobile device to another device. In order to serve a mobile device while it is travelling (or roaming) from a registered network to a visited network, Mobile IP has been proposed by the Internet Engineering Task Force (IETF) to allow mobile device users to move from one network to another while maintaining a permanent IP address.

A version of Mobile IP is Mobile IP version 6 (MIPv6). In a MIPv6 based communication system, a mobile device has a home address (HoA). When the mobile device changes its location and moves into a visited network, it receives a care-of address (CoA) from the visited network. In a MIPv6 mobile network, the mobile device then sends a binding update to a home agent in its home network. The binding update causes the home agent to establish a binding between the HoA and the CoA. Subsequently, the home network forwards data packets destined to the mobile device's HoA to the mobile device's current CoA.

Proxy MIPv6 (PMIPv6) is a variant of MIPv6 where the mobile device is not involved in the updating of its current location. Instead, PMIPv6 relies on a proxy mobility agent, such as Mobile Access Gateway (MAG), to detect a mobile device's attachments and detachments and signal the binding update to the a local mobility anchor (LMA). PMIPv6 is promulgated to support an efficient binding update by assigning the proxy agents, such as the MAGs, to report the location change to the home LMA.

One disadvantage of the existing PMIPv6 based network is the triangle routing problem caused by having the LMA in one single network and illustrated in FIG. 1. FIG. 1 includes a home network 140, a home LMA (H-LMA) 150, a visited network 130, a MAG 160, a Mobile Node (MN) 110 and a Correspondent Node (CN) 120, which is a communication partner of the MN 110. The MN 110 and the CN 120 are geographically close to each other, but both the MN 110 and the CN 120 are far away from the H-LMA 150. The MN 110 is located within a visited network 130.

In a PMIPv6 network, the MN 110 may be a notebook computer, a mobile phone or a PDA. The MN 110 has two IP addresses in a PMIPv6 network. The H-LMA 150 allocates an HoA to the MN 110. The HoA is used to communicate with the CN 120. This address does not change and serves the purpose of identification of the MN 110. In contrast, a CoA is a temporary address an MN 110 acquires when it visits a foreign network. In this PMIPv6 network example, when the MN 110 moves from the H-LMA 150 and enters a visited network, the MAG 160 detects the attachment and signals a binding update to the H-LMA 150 located in the home network 140. The H-LMA 150 binds the CoA with the HoA to map the MN's 110 current location with its HoA.

When the CN 120 sends messages to the MN 110, the messages are addressed to the HoA of the MN 110. In accordance with the home address attached with the messages, the messages are directed to the home network where the H-LMA 150 intercepts the message. The H-LMA 150 tunnels the messages to the MN 110's visited network based on its CoA. The network repeats this triangle routing until all messages from the CN 120 reach the MN 110. Accordingly, the communication path is unnecessarily long, and results in inefficient routing and high message delays.

Accordingly, what is needed in the art is an optimized mobility routing for a communication network.

SUMMARY OF THE INVENTION

These and other problems are generally solved or circumvented, and technical advantages are generally achieved, by preferred embodiments of the present invention which provide a method and system for optimizing mobility routing in a proxy mobile internet protocol network.

In accordance with a preferred embodiment of the present invention, a network communication system comprises at least one home local mobility anchor located in a first network and a first distributed local mobility anchor located in a second network. A second distributed local mobility anchor is located in a third network and the second distributed local mobility anchor is configured to transmit a first data packet to the home local mobility and is also configured to transmit a second data packet directly to the first distributed local mobility anchor after receiving a response from the at least one home local mobility anchor.

In accordance with another preferred embodiment of the present invention, a method for routing data packets comprises transmitting a first data packet from a first distributed local mobility anchor to a home distributed local mobility anchor, the first data packet comprising a first address. The first data packet is received at a home distributed local mobility anchor. It is then converted to a second data packet which is transmitted from the home distributed local mobility anchor to the first distributed local mobility anchor, the second data packet comprising a second address.

In accordance with yet another preferred embodiment of the present invention, a method for transmitting data packets comprises transmitting a first data packet from a first distributed local mobility anchor to a home local mobility anchor. In response to the first data packet, a direct access tunnel is generated between the first distributed local mobility anchor and a second distributed local mobility anchor. A subsequent data packet is transmitted along the direct access tunnel from the first distributed local mobility anchor to the second distributed local mobility anchor.

In accordance with yet another preferred embodiment of the present invention, a system for transmitting data packets comprises a home local mobility anchor and a first distributed local mobility anchor communicably coupled to the home local mobility anchor at a first time for an initial transmission. The system also comprises a second distributed local mobility anchor, wherein the first distributed local mobility anchor is communicably coupled directly to the second distributed local mobility anchor at a second time for a subsequent transmission.

An advantage of a preferred embodiment of the present invention is bypassing an unnecessarily long data path between nodes. Such a bypassing optimizes the data paths and allows for a more efficient use of network resources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system having distributed local mobility anchors for achieving optimized routing in a Proxy Mobile IPv6 based network. The invention may also be applied, however, to other communication networks.

Figure 1:
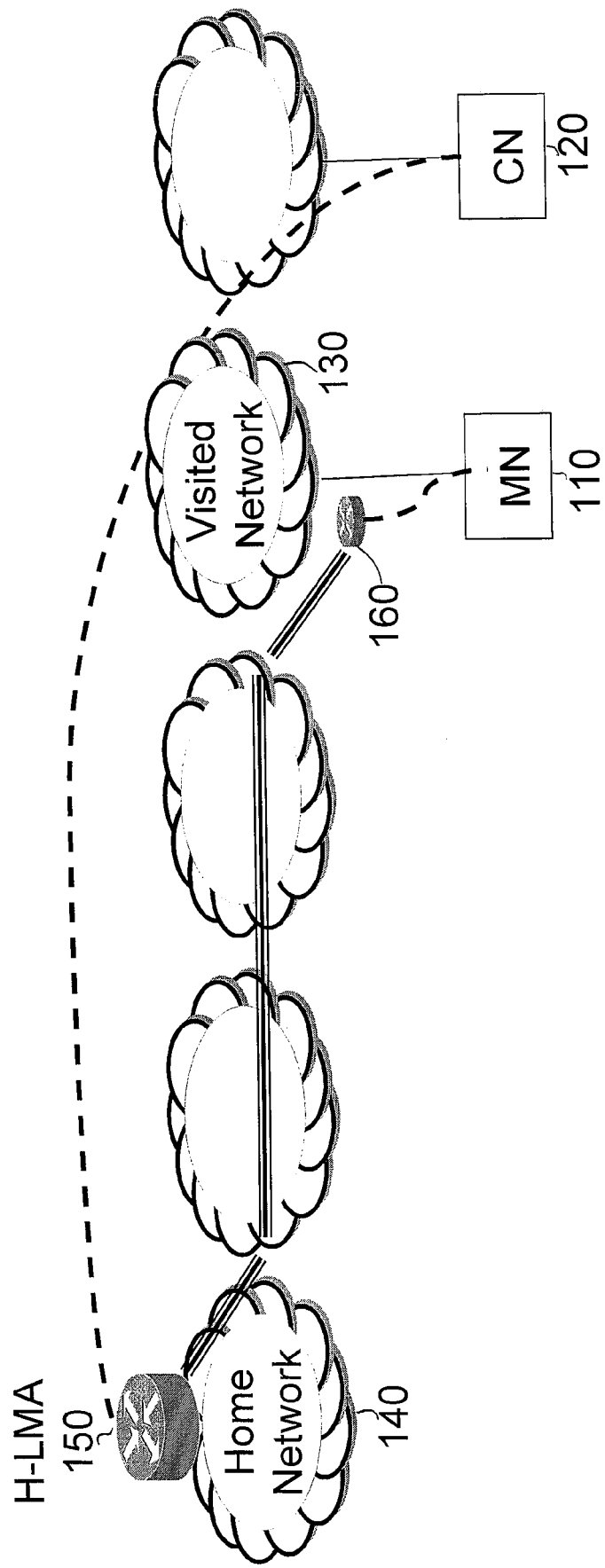
FIG. 1 illustrates the triangle routing problem in network communication systems as known in prior art.
Figure 2:
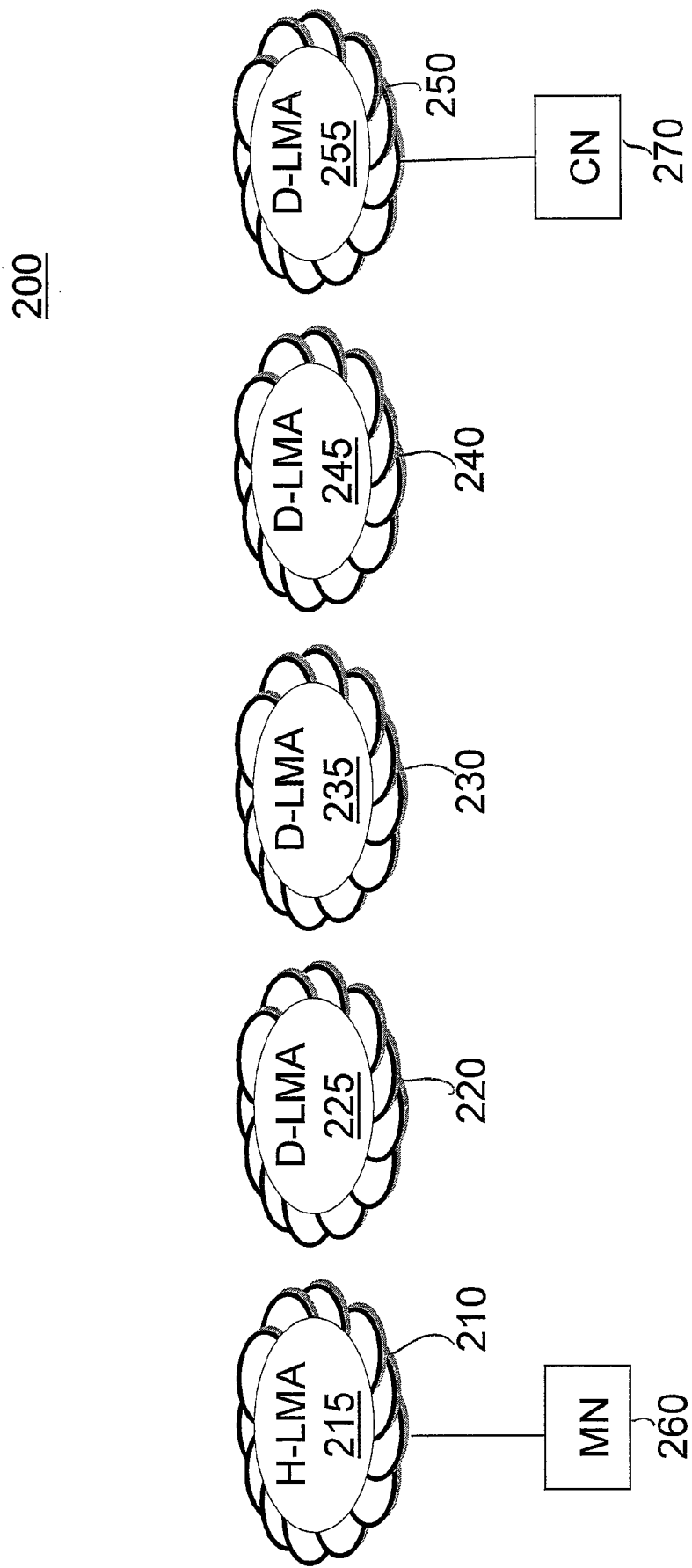
FIG. 2 illustrates a system of networks in accordance with an embodiment of the present invention.

With reference now to FIG. 2, a system of networks 200 is illustrated that provides communication between a first Mobile Node (MN) 260 and a fixed Correspondent Node (CN) 270. The first MN 260 may comprise any device that may change its location within the system of networks 200, and still desires to communicate, either directly or indirectly, with the system of networks 200. The first MN 260 may include mobile phones, personal data assistants (PDAs), notebook computers, other computers that may change location, or the like, and any suitably portable device that may be used to transfer data from itself to another device may be used as the first MN 260. All such devices are fully intended to be included within the scope of the present invention. As illustrated in FIG. 2, the first MN 260 is initially anchored to the first network 210 and a home local mobility anchor (H-LMA) 215 (discussed further below) located with the first network 210.

The CN 270 may comprise any stationary or mobile device, such as a computer or telephone, that can communicate with the first MN 260 and has a relatively fixed position within the system of networks 200. For example, the CN 270 may have a static, fixed address within the system of networks 200 that will not change over time.

The system of networks 200 may include a first home network 210 (a network to which the first MN 260 is initially registered), a second network 220, a third network 230, a fourth network 240, and a fifth network 250. Each of the individual networks may comprise one or more computers or other devices connected to a common server that preferably share a common Internet Protocol (IP) address. For example, the networks may be an access service network (ASN), a connectivity service network (CSN), a plurality of ASNs or CSNs, combinations of these, or the like. Additionally, each of the individual networks may be located in various geographic locations, wherein some networks may be geographically close to each other and other networks may be geographically far away from each other. For example, the fourth network 240 and the fifth network 250 may be close to each other geographically, but they may be far removed from the first network 210.

Additionally, each of the individual networks may include certain infrastructure to assist it in providing communication services, such as wireless access points (WAPs), base transceiver stations (BTSs), base station controllers (BSCs), routers, switches, bridges, and/or routing logic circuitry. Suitable networks may include the world-wide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), or the like.

Furthermore, each of the individual networks (e.g., the first home network 210, the second network 220, the third network 230, the fourth network 240, and the fifth network 250) may comprise a number of subnetworks, or distinctly addressable regions within the individual networks that may be addressed separately from each other while still sharing the common IP address. Furthermore, it should be recognized that while FIG. 2 may illustrate the system of networks 200 having five networks with various subnetworks, the system of networks 200 may accommodate any number and configuration of networks while still remaining within the scope of the present invention.

The network system may preferably operate with a mobility management protocol such as Proxy Mobile Internet Protocol version 6 (PMIPv6). In the PMIPv6 protocol, the first MN 260 is assigned an initial home address (HoA) of 128 bits by the first home network 210 to which it is registered. Then, when the first MN 260 moves from network to network (e.g., from the first home network 210 to the third network 230, as further discussed below with respect to FIG. 3), the first MN 260 maintains the original HoA. However, the system of networks 200 itself, through the use of local mobility anchors (LMAs, discussed further below), are updated with the current address of the first MN 260 and can route the data packets to the first MN's 260 current location by appending a "Care-of" address (CoA) onto the data packet and routing the data packet to the first MN's 260 current location.

However, as one of ordinary skill in the art will recognize, the PMIPv6 protocol described above is intended to be illustrative only, and is not intended to limit the present invention to the PMIPv6 protocol. Any other suitable mobility management protocol, such as PMIPv4, mobile IP, combinations of these, or the like, may alternatively be utilized with the present invention, and all of these alternative mobility management protocols are fully intended to be included within the scope of the present invention.

Preferably, the mobility management protocol may use an ANYCAST addressing technique to address and send data packets from point to point. In the ANYCAST technique, each of the individual LMAs (discussed further below and comprising the H-LMA 215, the first D-LMA 225, the second D-LMA 235, the third D-LMA 245, and the fourth D-LMA 255) may own a set of IP prefixes which the individual LMAs may use to allocate HoAs to, e.g., the first MN 260. The HoA prefixes of all of the individual LMAs may form a superset of HoA prefixes, some of which may be aggregatable and some of which may not be aggregatable.

In order to expedite communications, all of the individual LMAs advertise the superset of common ANYCAST addresses/prefixes. The originating network, such as the first network 210 if the first MN 260 is transmitting the data packet, includes with the data packet both the HoA along with the ANYCAST address/prefix. With the ANYCAST address/prefix, a data packet from the first MN 260 may be routed to any of the individual LMAs broadcasting the superset of ANYCAST addresses/prefixes, such as the nearest LMA advertising the superset, taking into account not only geography but also the topology of the networks themselves. In this fashion, if the geographically closest network is interrupted by an interruption of service, the data packet can be routed to the next closest computer advertising the superset, thereby helping to optimize the overall performance of the ANYCAST technique.

However, as one of ordinary skill in the art will recognize, the ANYCAST addressing technique described above is merely an exemplary embodiment and is not intended to limit the scope of the present invention. Any other suitable addressing technique may alternatively be utilized instead of the ANYCAST addressing system. All such addressing systems are fully intended to be included within the scope of the present invention.

The system of networks 200 may include one or more home local mobility anchor (H-LMA) 215, such as the H-LMA 215 located within the first home network 210. The H-LMA 215 may be implemented in either hardware or software and can download from a home AAA server the profile of the first MN 260. Additionally, the H-LMA 215 may provide three or more distinct logical functions pertaining to the system of networks 200. First, the H-LMA 215 may provide a home network prefix or home address (HoA) allocation function in which the H-LMA 215 allocates a HoA belonging to a block of ANYCAST prefixes managed by the H-LMA 215 to the first MN 260, which is registered to the first home network 210. To perform the HoA allocation function, the H-LMA 215 may use its own block of IP prefixes to allocate IP addresses to the first MN 260 that is registered to the H-LMA 215. Because the H-LMA 215, the first D-LMA 225, the second D-LMA 235, the third D-LMA 245, and the fourth D-LMA 255 all advertise the same superset of IP prefixes from the H-LMA 215, no matter where the first MN 260 is located, the ANYCAST and the routing algorithms may enable the closest of the LMAs to serve the first MN 260.

Secondly, the H-LMA 215 may provide an internetwork location management function in which the H-LMA 215 may manage and track the location within the system of networks 200 of the first MN 260, thereby providing, with other H-LMAs (not shown), a distributed database of all such records for all mobile devices, including the first MN 260, that are anchored to the system of networks 200. This internetwork location management function may also include a generation of a care-of address (CoA) which may be appended to the HoA in order to appropriately route data packets when the first MN 260 is anchored in a network that is not the first home network 210. As the first MN 260 visits the third network 230 from the first home network 210, the H-LMA 215 tracks the location of the first MN 260 and also appends the CoA which, along with the HoA, allows for the transmission of data packets to the first MN 260 (as described further below with reference to FIGS. 4-5) when it is anchored to, e.g., the fourth network 240.

Thirdly, the H-LMA 215 may perform a mobility routing function. With this functionality, the H-LMA 215 may receive data packets containing the HoA of the first MN 260 even though the first MN 260 is no longer anchored to the H-LMA 215. The mobility routing function can take the CoA from the internetwork location management and can then add the CoA to the data packets in addition to the HoA. The data packet with both the CoA and the HoA may then be forwarded to the current location of the first MN 260.

Additionally, the H-LMA 215 may forward the data packets to a D-LMA, such as the third D-LMA 245. This situation may arise when the H-LMA 215 uses a hierarchical system to track the location of the first MN 260. In these situations, the H-LMA 215 may forward the data packets to the third D-LMA 245, which may be able to determine how to forward the data packets to their final destination. The third D-LMA 245 may do so through another layer of hierarchy by forwarding the data packet to the CoA of the MAG 430 which will then forward the packet to the first MN 260.

It should be noted that the three logical functions in the H-LMA 215 may be considered separate and one function does not necessarily need to be co-located with the other two functions. As such, the H-LMA 215 does not need to be located within one single physical entity. In fact, it is possible to have one or more physical entities in one or more locations to provide the various functions described above, and these different entities do not need to be in a on-to-one relationship with each other. Any combination of functionality and physical location may alternatively be utilized with the present embodiments, and all such combinations are fully intended to be included within the scope of the present embodiments.

Further illustrated in FIG. 2 is a plurality of distributed local mobility anchors (D-LMAs), such as a first D-LMA 225 (located in the second network 220), a second D-LMA 235 (located in the third network 230), a third D-LMA 245 (located in the fourth network 240), and a fourth D-LMA 255 (located in the fifth network 250). Each of the first D-LMA 225, second D-LMA 235, third D-LMA 245, and fourth D-LMA 255 know which HoA prefixes are owned by the H-LMA 215, and each of the D-LMAs may be implemented in either hardware or software as part of their respective networks (e.g., the second network 220, the third network 230, the fourth network 240, and the fifth network 250). Each of the first D-LMA 225, second D-LMA 235, third D-LMA 245, and fourth D-LMA 255 may also be located within one of the subnetwork levels of each of their respective networks.

The first D-LMA 225, second D-LMA 235, third D-LMA 245, and fourth D-LMA 255 preferably have a functionality that is reduced from the H-LMA 215. For example, while the H-LMA 215 may provide the three functionalities described above (e.g., the HoA allocation function, the internetwork location management function, and the mobility routing function), the first D-LMA 225, second D-LMA 235, third D-LMA 245, and fourth D-LMA 255 may each provide a subset of the three functionalities without the need for the remaining functionalities. Such reduced functionality allows for the first D-LMA 225, second D-LMA 235, third D-LMA 245, and fourth D-LMA 255 to provide needed functionalities without also requiring needless, expensive, and resource intensive replication of the entire H-LMA 125 at each of the individual networks.

As an example, the first D-LMA 225, second D-LMA 235, third D-LMA 245, and fourth D-LMA 255 may each provide the mobility routing function while relying upon the H-LMA 215 to provide the remaining functionalities. As such, when the first MN 260 is initially anchored to the first home network 210 and then visits the fourth network 240 (which movement is discussed further below with respect to FIG. 3), the third D-LMA 245 may take over the mobility routing function from the H-LMA 215 and intercept data packets sent from the first MN 260 in order to route them to their respective destinations without having to rely upon the H-LMA 215.

Figure 3:
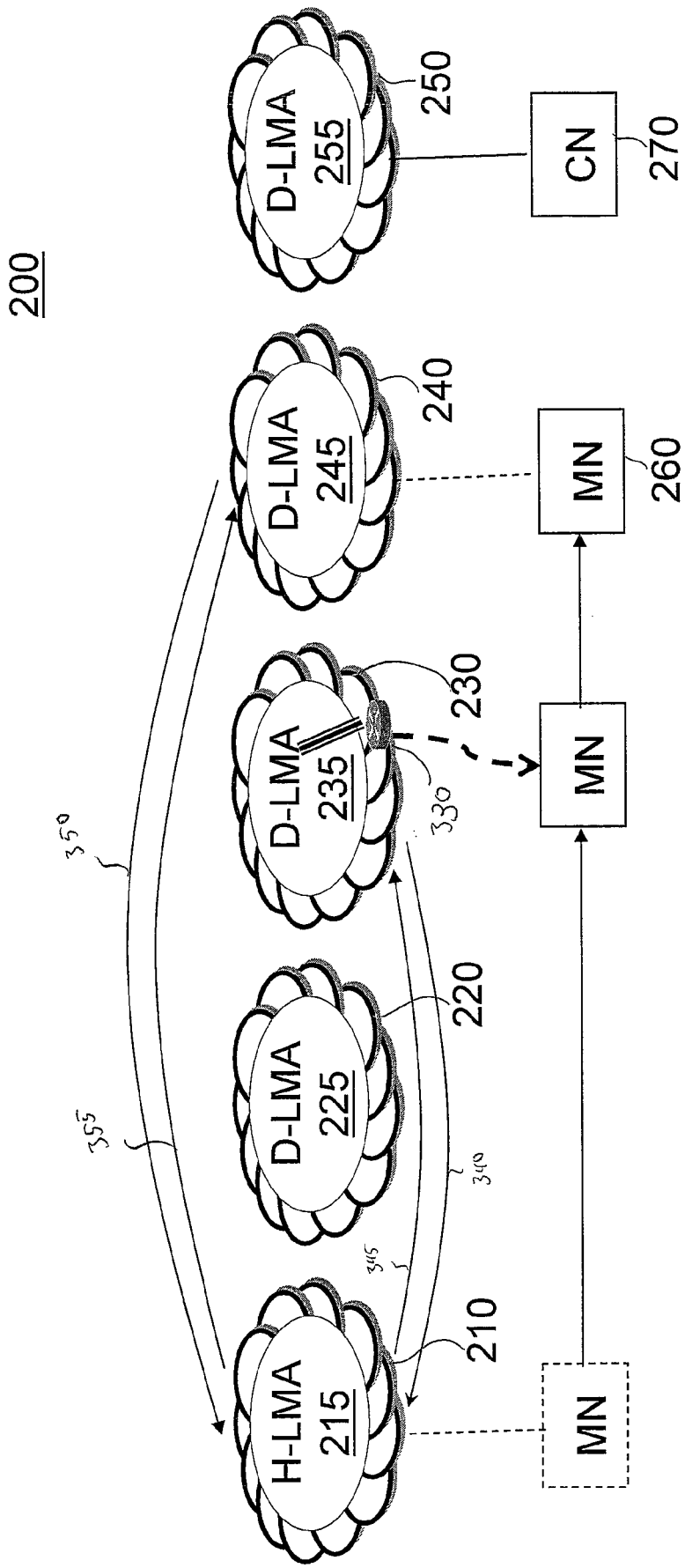
FIG. 3 illustrates a binding process in accordance with an embodiment of the present invention.

FIG. 3 illustrates a binding process that may be used during the transition of the first MN 260 from the first home network 210 to the third network 230 in order to anchor and bind the first MN 260 and also transfer the functionality. In an embodiment utilizing the PMIPv6 mobility management protocol, the third network 230 may include a first Mobility Access Gateway (MAG) 330. The first MAG 330 may be responsible for detecting when a first MN 260 is entering or exiting from the third network 230. Upon such a detection, the first MAG 330 may initiate a binding update through the second D-LMA 235 to the H-LMA 215 located within the first home network 210. The first MAG 330 may be implemented in either hardware or software, and may be implemented on an access router (not shown) that may be part of the third network 230.

In an embodiment using the PMIPv6 addressing protocol, the third network's 230 IP address prefixes and the first home network's 210 IP address prefixes belong to the same superset. The second D-LMA 235 may advertise the superset's IP address prefixes including the home IP address prefixes, which is received by the first MN 260 when the first MN 260 travels within range of the third network 230. After the first MN 260 receives the prefix advertisement of its home address IP prefix from the second D-LMA 235, the first MAG 330 may use its IP address as a proxy-CoA and send a binding update message including the proxy-CoA to the second D-LMA 235 on behalf of the first MN 260 using the HoA of the first MN 260.

In order to have a reliable binding update, the second D-LMA 235 identifies which H-LMA 215 the first MN 260 is registered with by examining the HoA's prefix from the first MN 260. After the H-LMA 215 has been identified, the second D-LMA 235 may send an first authentication request 340 including the HoA (or HoA IP prefix in IPv6) and proxy-CoA as well as other needed identifiers to the H-LMA 215. If the H-LMA 215 determines that the first MN 260 with the HoA is valid, the H-LMA 215 may send a first authentication notification 345 back to the second D-LMA 235 which will anchor the first MN 260 with the second D-LMA 235. Subsequently, the second D-LMA 245 may provide the mobility routing function for the first MN 260.

FIG. 3 further illustrates the movement of the first MN 260 from the second network 230 to the fourth network 240. The third D-LMA 245 may repeat a similar authentication process as the one described above. For example, the third D-LMA 245 may send a second authentication request 350 to the H-LMA 215 and then, once the H-LMA 215 has determined that the first MN 260 with the HoA is valid, the third D-LMA 235 may send a second authentication notification 355 to the third D-LMA 245 and register the first MN 260 such that the first MN 260 is anchored to the fourth network 240 instead of the third network 230.

Additionally, the third D-LMA 245 may also send an update to the second D-LMA 235 in order to inform the second D-LMA 235 of the handoff. In an interim period before the H-LMA 215 binds the new CoA with the HoA, the second D-LMA 235 may redirect all data packets to the MN's 260 current location (the third D-LMA 245). Once the authentication process succeeds, the first MN 260 is anchored to the third D-LMA 245 and the H-LMA 215 will redirect all subsequent data packets to the MN's 260 new address at the fourth network 240.

Figure 4:
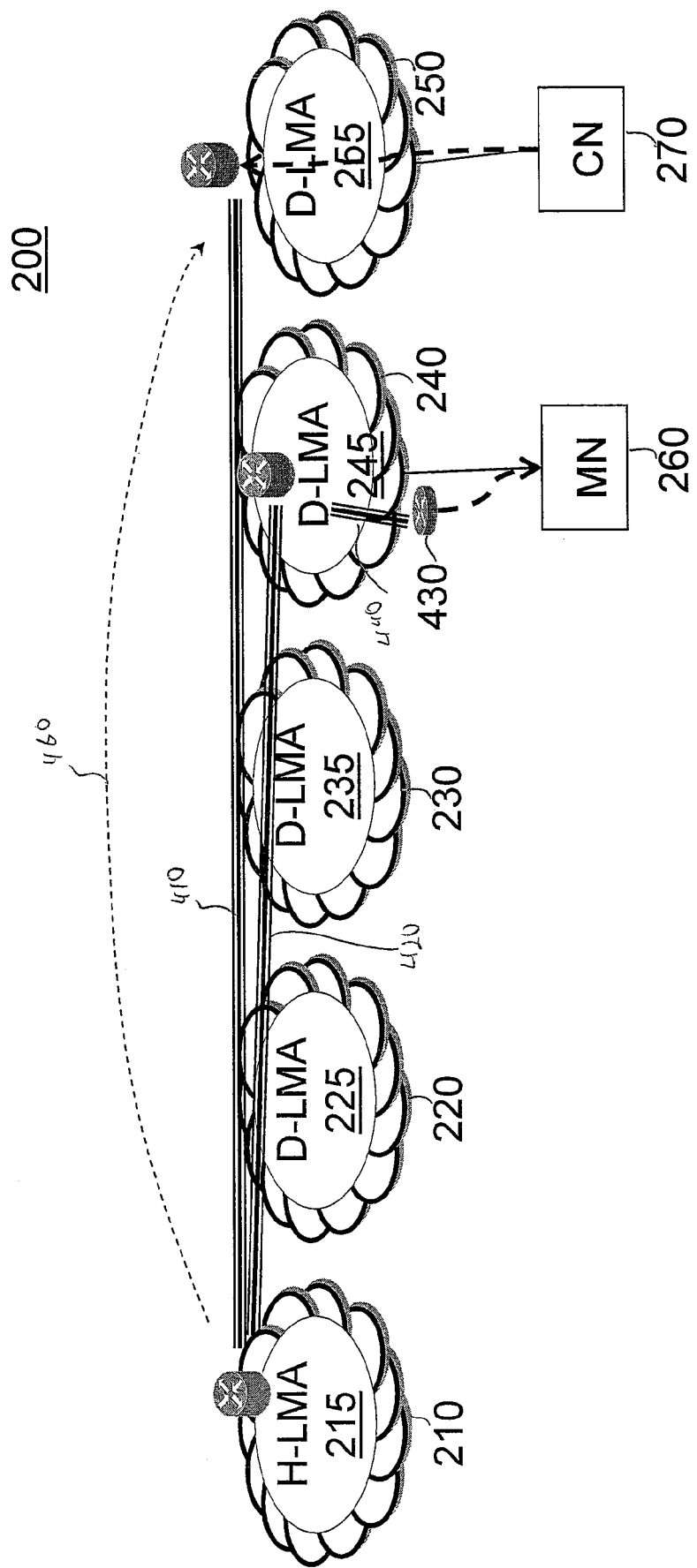
FIG. 4 illustrates an initial step in an optimized routing methodology in accordance with an embodiment of the present invention.

FIG. 4 illustrates an initial step in an optimized routing methodology that may be used to route data packets from the CN 270 to the MN 260. In this embodiment, an initial data packet containing the HoA of the MN 260 may be sent by the CN 270 and intercepted by the fourth D-LMA 255 (which may also be called the originating D-LMA (OD-LMA)). As part of the transmission process, the fourth D-LMA 255 may first scan its memory (which may be a cache or other suitable type of memory, not shown) to determine whether the HoA associated with the initial data packet is actually an initial data packet by comparing the HoA with other HoA's that have been stored in the memory. If the first MN's 260 HoA is already stored in the memory, and the fourth D-LMA 255 already knows where to send the initial data packet (which may occur from a previous communication session between the first MN 260 and the CN 270), the fourth L-DMA 255 may send the initial data packet directly to the third L-DMA 245 located within the fourth network 245.

However, if the HoA has not been stored in the memory of the fifth D-LMA 255, the fifth D-LMA 255, based on the prefix of the HoA, may direct the initial data packet directly to the H-LMA 215. This transmission may be performed by generating a first tunnel 410 to transmit data packets between the fourth D-LMA 255 and the H-LMA 215. The first tunnel 410 may be set up using a suitable tunneling protocol as is known in the art.

When the H-LMA 215, which has been updated with the first MN's 260 current location through the binding process (described above with respect to FIG. 3), receives the initial data packet from the fifth D-LMA 255 through the first tunnel 410, the H-LMA 215 may de-encapsulate the initial data packet to read the HoA of the first MN 260. If the first MN 260 is not anchored to the first network 210 where the H-LMA 215 is located, such as being anchored to the fourth network 240 as illustrated in FIG. 4, the H-LMA 215 may re-route the initial data packet to the fourth D-LMA 245 by appending the initial data packet with the CoA or proxy-CoA of the first MN's 260 current network location. The H-LMA 215 may then generate a second tunnel 420 to the third D-LMA 245.

The third D-LMA 245 may de-encapsulate the initial data packet and use the CoA or proxy-CoA to forward the initial data packet to the first MN 260 by, e.g., tunneling the initial data packet to a first mobile access gateway (MAG) 430 located within the fourth network 240. The first MAG 430 may control the connection to the first MN 260, helping to manage data packets to and from the fourth network 240 on behalf of the first MN 260 and ensuring that the data packets are in a form that the first MN 260 can understand. The first MAG 430 may also perform other functions such as push content delivery.

The third D-LMA 245 may forward the initial data packet to the first MAG 430 by generating a third tunnel 440 between the third D-LMA 245 and the first MAG 430, by which the initial data packet may be transmitted to the first MAG 430. The first MAG 430, once it has received the initial data packet from the third D-LMA 245, translates the initial data packet into a form that the first MN 260 can understand and then sends the initial data packet to the first MN 260.

In addition to simply direct the initial data packet to its desired destination, the H-LMA 215 may also send mapping information including the CoA or proxy-CoA of the first MN 260 back to the fourth D-LMA 255 (as represented in FIG. 4 by dashed line 460), which may save the address information in its memory. With the current address stored in memory, any subsequent data packet may be routed directly to the third D-LMA 245 instead of the H-LMA 215, thereby bypassing the H-LMA 215 and eliminating the triangle problem for subsequent data packets.

In an embodiment, the CoA may be held within the memory for a certain amount of time, such as between about ten minutes and about thirty minutes. This time period may be determined using, for example, a timer (not shown). Once the timer has expired, the CoA may be deleted from the memory, and any subsequent transmissions would need to again send the initial data packet to the H-LMA 215 as described above with respect to FIG. 4 in order to reobtain the CoA from the H-LMA 215.

Figure 5:
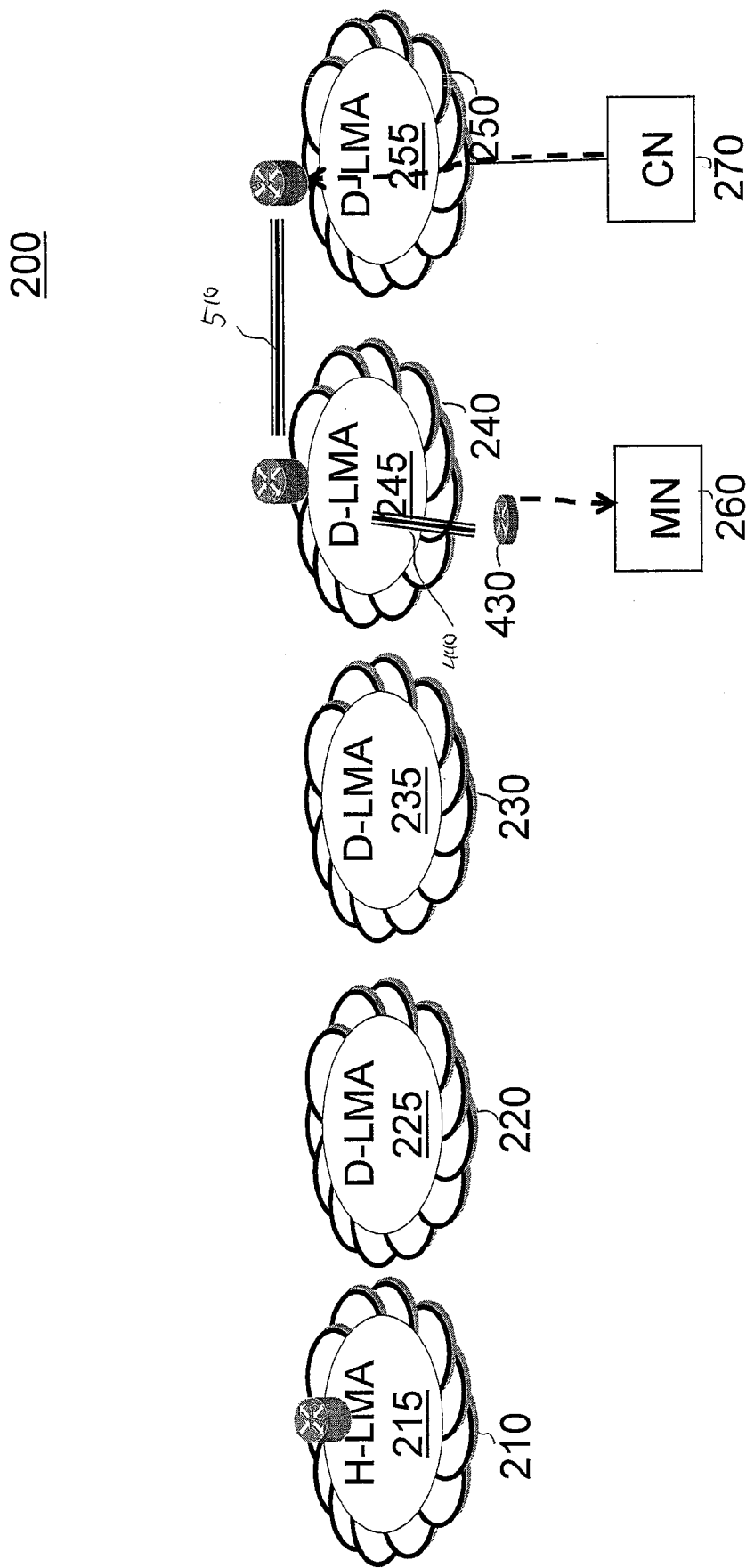
FIG. 5 illustrates subsequent steps in an optimized routing methodology in accordance with an embodiment of the present invention.

FIG. 5 illustrates a path taken by subsequent, non-initial data packets between the CN 270 and the first MN 260. Because the fourth D-LMA 255 has acquired the mapping information regarding the first MN's 260 current CoA or proxy-CoA, the fourth D-LMA 255 can use the CoA or proxy-CoA to forward the subsequent data packets directly to the third D-LMA 245 using, for example, a fourth tunnel 510. Alternatively, the fourth D-LMA 255 may use the CoA to directly tunnel the packet to the first MN 260 itself or else to the first MAG 430, thereby bypassing the third D-LMA 245.

By sending the subsequent data packets directly to the third D-LMA 245, the H-LMA 215 can be effectively removed from the transmission of subsequent data packets, thereby eliminating the triangle problem after the initial data packet. The third D-LMA 245 can then forward the subsequent data packets to the first MAG 430 through, e.g., the third tunnel 440, and the first MAG 430 can translate the subsequent data packets and then forward the subsequent data packets to the first MN 260. Such a bypassing optimization may be performed during an initial setup routine, and may have only a minimal impact over the entirety of the communication.

Figure 6:
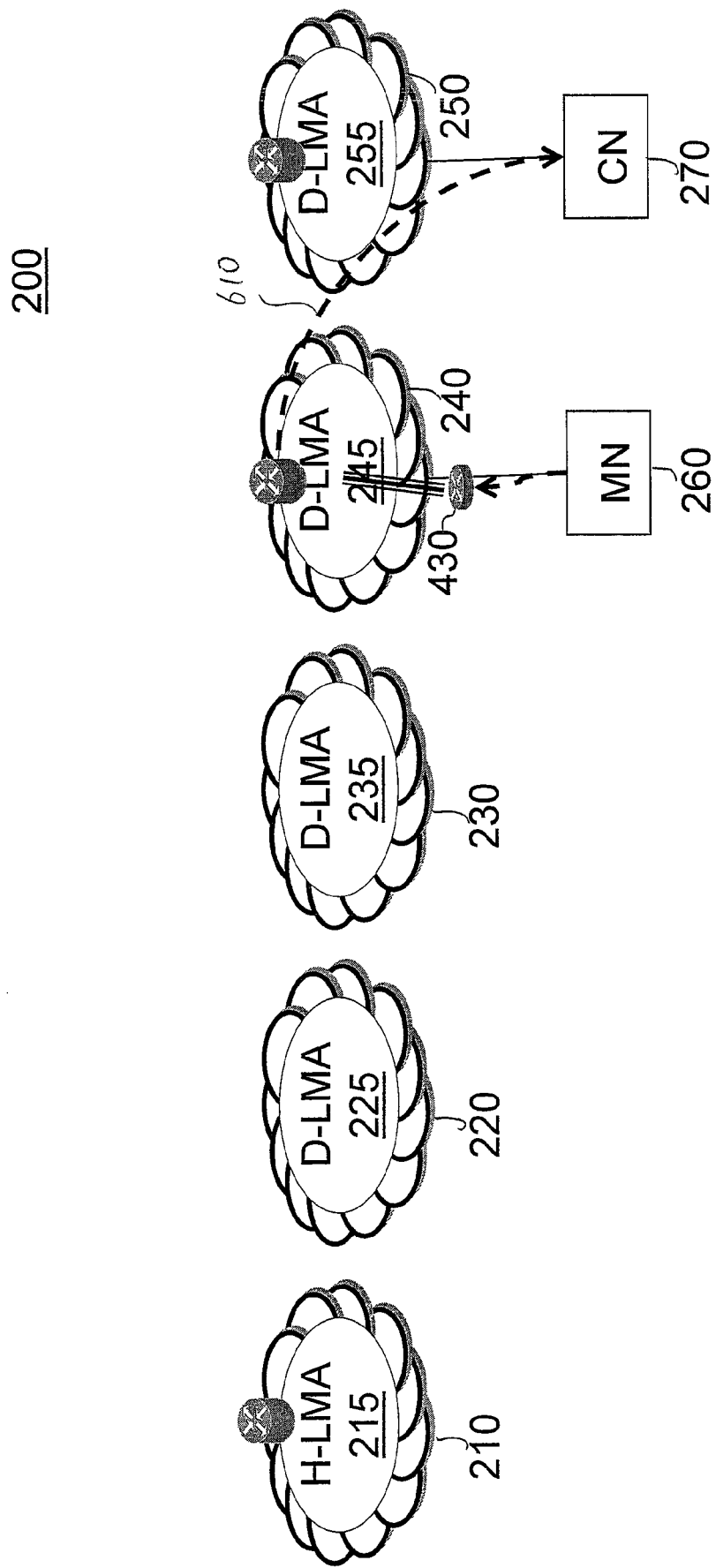
FIG. 6 illustrates a transmission from a mobile node to a correspondent node in accordance with an embodiment of the present invention.

FIG. 6 illustrates a transmission from the first MN 260 to the CN 270, which has a fixed location that is already known to the third D-LMA 245 and its mobility routing functionality. As such, after the data packets from the first MN 260 routes has reached the third D-LMA 245, the third D-LMA 245 is capable of directing the data packets directly to the CN 270 (as represented in FIG. 6 by the dashed line 610). As such, the data packets from the first MN 260 that are addressed to the CN 270 may go through the tunnel from the MAG 430 to the third D-LMA 245. Upon exiting the tunnel, the source IP address of the data packet is still HoA so that the privacy of the first MN's 260 location is protected.

Figure 7:
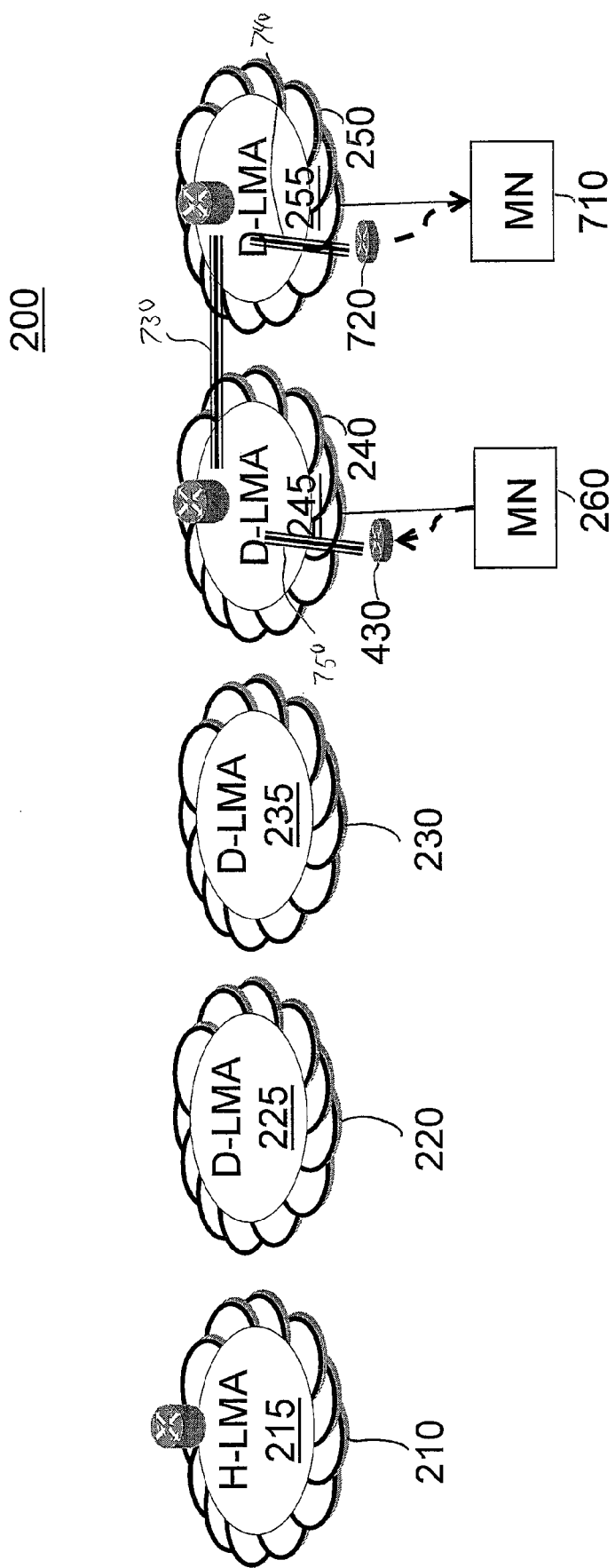
FIG. 7 illustrates a transmission from a first mobile node to a second mobile node in accordance with an embodiment of the present invention.

FIG. 7 illustrates a transmission of data packets from the first MN 260 anchored in the fourth network 240 to a second MN 710 anchored in, for example, the fifth network 250. In an embodiment, the third D-LMA 245 has already acquired the mapping information and proxy-CoA of the second MN 710 from a previous initial data packet transmission (which has preferably gone through the H-LMA 215 as described above with respect to FIG. 4). Thus, after the third D-LMA 245 receives the data packets from the first MN 260 (preferably through a fourth tunnel 750 and the first MAG 430), the third D-LMA 245 can route the data packets to the fourth D-LMA 255 directly through, e.g., a fifth tunnel 730. The fourth D-LMA 255 may then forward the data packets to the second MN 710 through, for example, a sixth tunnel 740 and a second MAG 720.

Additionally, a similar process may be repeated in order to send data packets from the second MN 710 to the first MN 260. For example, the second MN 710 may send an initial data packet to the fourth D-LMA 255 (through, e.g., the second MAG 720), which forwards the initial data packet to the H-LMA 215. The H-LMA 215 can forward the initial data packet to the third D-LMA 245 and also send mapping information for the first MN 260 back to the fourth D-LMA 255. Subsequent data packets may be routed by the fourth D-LMA 255 directly to the third D-LMA 245, which may then route the subsequent data packets to the first MN 260.

In some cases the first MN 260 and the second MN 710 may move between networks concurrently. For example, the first MN 260 may move from the fourth network 240 to the second network 220 and the second MN 710 may move from the fifth network 250 to the third network 230. Without correction, the third D-LMA 245 (previously the anchor for the first MN 260), would continue to use the now outdated address and continue to route data packets to the fourth D-LMA 255 (previously the anchor for the second MN 710).

Accordingly, in an embodiment of the present invention where, for example, the first MN 260 anchors to the third network 230, the second L-DMA associated with the third network 230 may send both a binding update notification to the H-LMA 215 and also send an updated data packet to the third D-LMA 245 in the fourth network 240 (where the first MN 260 had previously been anchored). As such, until the H-LMA 215 updates, the third D-LMA 245 may forward data packets it receives directly to the second D-LMA 245 and may also inform the fourth D-LMA 255 (located in the fifth network 250 which was sending the data packets to the third D-LMA 245) to route subsequent data packets directly to the second D-LMA 245. A similar process may be used for the movement of the second MN 710 from the fifth network 250 to the third network 230.

Figure 8:
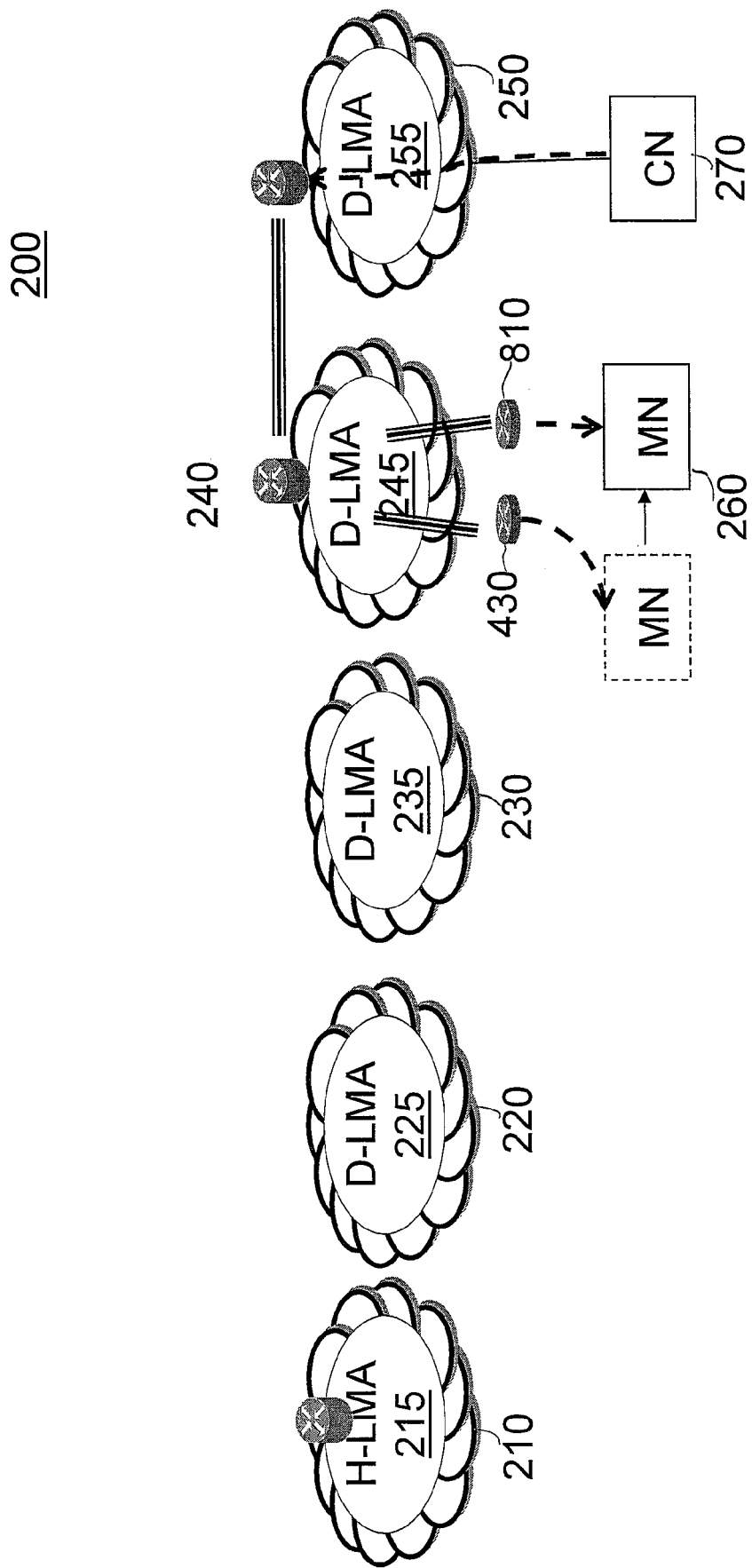
FIG. 8 illustrates a first mobile node transferring between mobility access gateways located within the same network in accordance with an embodiment of the present invention.

FIG. 8 illustrates a situation in the first MN 260 may transfer from the first MAG 430 to a third MAG 810 located within the fourth network 240. In this embodiment, as the proxy-CoA changes from the first MAG 430 to the third MAG 810, the third D-LMA 245 may update the mapping between the HoA and the proxy-CoA and, if the third D-LMA 245 is receiving data packets, will forward the data packets to the third MAG 810 for eventual transmission to the first MN 260.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network communication system comprising:
    at least one home local mobility anchor located in a first network, wherein the home local mobility anchor has a first set of functionalities comprising home address allocation, internetwork location management, and mobility routing;
    a first distributed local mobility anchor located in a second network, wherein all elements in the second network share a first internet protocol address; and
    a second distributed local mobility anchor located in a third network, wherein all elements in the third network share a second internet protocol address different from the first internet protocol address, the second distributed local mobility anchor configured to transmit a first data packet to the home local mobility anchor and configured to transmit a second data packet directly to the first distributed local mobility anchor after receiving a response from the at least one home local mobility anchor, wherein the first distributed local mobility anchor and the second distributed local mobility anchor each has a second set of functionalities that comprises at least one, but not all, of the home address allocation, the internetwork location management, and the mobility routing.

2. The network communication system of claim 1, wherein the home local mobility anchor is configured to receive the first data packet and, in response to receiving the first data packet, transmit an address of the first distributed local mobility anchor to the second distributed local mobility anchor.

3. The network communication system of claim 1, wherein the home local mobility anchor is further configured to transmit an address of the second local mobility anchor to the first local mobility anchor.

4. The network communication system of claim 1, wherein the first distributed local mobility anchor is configured to send a binding update to the home local mobility anchor.

5. The network communication system of claim 1, wherein the first network further comprises a first mobility access gateway.

6. The network communication system of claim 5, wherein the second network further comprises a second mobility access gateway.

7. The network communication system of claim 1, wherein the first local mobility anchor and the second local mobility anchor are in closer geographic proximity to each other than the home local mobility anchor.

8. The network communication system of claim 1, further comprising a timer located within the second distributed local mobility anchor.

9. A method for routing data packets, the method comprising:
    transmitting a first data packet from a first distributed local mobility anchor in a first network to a home distributed local mobility anchor in a second network, wherein the home distributed local mobility anchor performs home address allocation, internetwork location management, and mobility routing, and wherein the first distributed local mobility anchor performs one or more, but not all, of the home address allocation, internetwork location management, and mobility routing, the first data packet comprising a first address, wherein the first network has a first internet protocol address and the second network has a second internet protocol address that is not shared by the first network; and
    receiving, by the first distributed local mobility anchor, a second data packet from the home distributed local mobility anchor to the first distributed local mobility anchor in response to the transmitting the first data packet, the second data packet comprising a second address.

10. The method of claim 9, further comprising transmitting a third data packet directly from the first distributed local mobility anchor to a second distributed local mobility anchor.

11. The method of claim 10, further comprising transmitting a fourth data packet from the second local mobility anchor to a mobile access gateway.

12. The method of claim 11, further comprising transmitting the fourth data packet from the mobile access gateway to a mobile device.

13. The method of claim 10, further comprising transmitting a fourth data packet from the home distributed local mobility anchor to the second distributed local mobility anchor, the third data packet comprising a third address for the first distributed local mobility anchor.

14. The method of claim 10, further comprising transmitting the third data packet from the second distributed local mobility anchor to a third distributed local mobility anchor, the third distributed local mobility anchor being an anchor for the first address.

15. The method of claim 10, further comprising transmitting an update message from a first mobile access gateway to the second distributed local mobility anchor in response to a mobile device transferring to the first mobile access gateway.

16. A method for transmitting data packets, the method comprising:
    transmitting an first data packet from a first distributed local mobility anchor to a home local mobility anchor, wherein the home local mobility anchor performs home address allocation, internetwork location management, and mobility routing, and wherein the first distributed local mobility anchor performs one or more, but not all, of the home address allocation, the internetwork location management, and the mobility routing;
    in response to the first data packet, generating a direct access tunnel between the first distributed local mobility anchor and a second distributed local mobility anchor, wherein the first distributed local mobility anchor and the second distributed local mobility anchor are located in different networks with different shared internet protocol addresses; and transmitting a subsequent data packet along the direct access tunnel from the first distributed local mobility anchor to the second distributed local mobility anchor.

17. The method of claim 16 wherein the generating the direct access tunnel further comprises:

transmitting a first address to the second distributed local mobility anchor, the first address being an address for the first distributed local mobility anchor; and transmitting a second address to the first distributed local mobility anchor, the second address being an address for the second distributed local mobility anchor.

18. The method of claim 17, further comprising transmitting a second data packet from the second distributed local mobility anchor directly to a correspondent node.

19. The method of claim 16, wherein the first data packet comprises the home address of the second distributed local mobility anchor.

20. The method of claim 16, wherein the transmitting the first data packet further comprises generating a tunnel between the first distributed local mobility anchor and the home local mobility anchor.

21. A system for transmitting data packets comprising:

a first distributed local mobility anchor configured to couple to a home local mobility anchor at a first time for an initial transmission and also configured to couple directly to a second distributed local mobility anchor at a second time for a subsequent transmission, wherein the first distributed local mobility anchor is in a first network with a first internet protocol address and the second distributed local mobility anchor is in a second network with a second internet protocol address different from the first internet protocol address, wherein the first distributed local mobility anchor has a reduced functionality from a functionality of the home local mobility anchor, the reduced functionality comprising performing one or more, but not all, of a home address allocation function, internetwork location management, and mobility routing, the functionality of the home local mobility anchor comprising all of the home address allocation function, internetwork location management, and mobility routing.

22. The system of claim 21, wherein the first distributed local mobility anchor comprises a first mobility access gateway.

23. The system of claim 21, wherein the second distributed local mobility anchor comprises a second mobility access gateway.

* * * * *